United States Patent
Pineda De Gyvez et al.

(10) Patent No.: US 7,500,204 B2
(45) Date of Patent: Mar. 3, 2009

(54) REAL-TIME ADAPTIVE CONTROL FOR BEST IC PERFORMANCE

(75) Inventors: Jose De Jesus Pineda De Gyvez, Eindhoven (NL); Francesco Pessolano, Eindhoven (NL); Rinze Ida Mechitildis Peter Meijer, Eindhoven (NL); Josep Rius Vazquez, Barcelona (ES); Kiran Batni Raghavendra Rao, Mysore (IN)

(73) Assignee: NXP B.V., Eindhoven (NL)

( * ) Notice: Subject to any disclaimer, the term of this patent is extended or adjusted under 35 U.S.C. 154(b) by 343 days.

(21) Appl. No.: 10/559,208

(22) PCT Filed: May 28, 2004

(86) PCT No.: PCT/IB2004/050799

§ 371 (c)(1),
(2), (4) Date: Dec. 6, 2005

(87) PCT Pub. No.: WO2004/109531

PCT Pub. Date: Dec. 16, 2004

(65) Prior Publication Data

US 2006/0123368 A1    Jun. 8, 2006

(30) Foreign Application Priority Data

Jun. 10, 2003    (EP) .................................. 03101678

(51) Int. Cl.
G06F 17/50    (2006.01)
G06F 1/00    (2006.01)
(52) U.S. Cl. ................................ 716/2; 716/4; 713/323
(58) Field of Classification Search ................. 716/1–2, 716/4, 17; 713/323
See application file for complete search history.

(56) References Cited

U.S. PATENT DOCUMENTS

| | | | |
|---|---|---|---|
| 6,538,314 B1 * | 3/2003 | Buffet et al. | 257/691 |
| 7,174,528 B1 * | 2/2007 | Burr et al. | 716/12 |
| 2002/0053039 A1 | 5/2002 | Inoue et al. | |
| 2004/0183588 A1 * | 9/2004 | Chandrakasan et al. | 327/545 |
| 2004/0268278 A1 * | 12/2004 | Hoberman et al. | 716/5 |

FOREIGN PATENT DOCUMENTS

EP    0943978 A    9/1999

* cited by examiner

*Primary Examiner*—Stacy A Whitmore

(57) ABSTRACT

The present invention relates to real-time adaptive control for best Integrated Circuit (IC) performance. The adaptive behavior is carried out on a local basis. The system is partitioned into different islands (30). Each island (30) is controlled and its working conditions are modified depending on some parameters. The remainder of the chip is controlled as well, depending on other parameters. This requires that each island (30) has a local controller (36) communicating with a global controller (42). The main control parameters are e.g. supply voltage, threshold voltage and clock frequency.

15 Claims, 7 Drawing Sheets

REAL-TIME ADAPTIVE CONTROL FOR BEST IC PERFORMANCE

The present invention relates to real-time adaptive control for best Integrated Circuit (IC) performance as well as to an IC with such control and a controller for performing such control.

The failure of sub-micrometer technologies to continue with constant process tolerances gives origin to significant challenges for design technologies for process and litho variability. As the variation of fundamental parameters such as channel length, threshold voltage, thin oxide thickness and interconnect dimensions goes well beyond acceptable limits, new circuit topologies, logic and layout optimizations must account for signal and supply noise, thermal gradients, EMI and substrate coupling.

Research efforts in this focus area delve into the incorporation of real-time adaptive schemes for the minimization of process and litho variability effects and improvement of timing and signal integrity closure. While process spreads are tightly controlled, their impact on circuit design and behavior is higher and higher. For instance, while before a variation of 100 mV on a threshold voltage Vt with regard to a nominal threshold voltage Vt of 450 mV was not that crucial, in deep sub-micron technologies with a nominal threshold voltage Vt of 350 mV a 100 mV variation can make circuit design quite difficult.

In traditional design for manufacturability schemes, a manufacturability analysis is performed when the layout is ready. If the operational yield is not high enough a diagnosis is carried out to either correct the process or the design. Experience gained from this type of analysis provides a direct feedback path to the circuit design stage, usually in the form of design for manufacturability (DfM) guidelines, for future integrated circuit (IC) implementations.

There are several disadvantages to this approach. The most notorious ones are that DfM comes into play too late in the design stage, it is passive as it is in the form of guidelines, and it may not be actual for new very deep sub-micron technologies.

To overcome these limitations, the incorporation of design activities for circuit performance and manufacturability (DfPM) prior to finishing of the IC is needed. Such activities aim at enabling circuit design technologies that are capable of attaining a required circuit manufacturability and performance.

US 2002/0131314 describes a semiconductor device enjoying high stability and improved reliability by protecting the electrical characteristics and the reliability against changes, notwithstanding a deviation or variation in he condition of the fabrication process condition and the operating condition. In order to obtain this, the operation voltage and/or operation current of circuits incorporated in the semiconductor device are controlled in dependence on deviation or variation in the fabrication process condition and the operating condition. The semiconductor chip comprises a control circuit and an internal circuit inherent to a semiconductor device. The control circuit is provided for generating control signals or controlled internal voltages in accordance with a deviation in the condition in the fabrication process as well as the operating condition in which the semiconductor device is used. The characteristics of the internal circuit can be maintained in predetermined constant relationship in conformance with the fabrication process condition and the operating condition. The internal circuit may be divided into several circuits each being provided with the respective control circuitry. In this case, the control can be achieved for realizing the optimum operation characteristics for the individual functions of the divided circuitries.

It is an object of the present invention to provide an integrated circuit with a global guaranteed level of performance, e.g. in terms of both speed and power, preferably independent of deviation or variation in the fabrication process condition and the operating condition.

The above objective is accomplished by a method and device according to the present invention.

According to an aspect of the present invention, the adaptive behavior is carried out on a local basis. The system is partitioned into different islands. Each can be contained in an isolated third well of a triple well CMOS technology. Triple well CMOS technology allows a well of a first type, e.g. a P-well, to be placed inside a well of a second type, e.g. an N-well, resulting in three types of well structures: simple wells of the first type, simple wells of the second type, and wells of a third type, consisting of a wells of the first type inside a deep well of the second type. The third type of well is useful for isolating circuitry within it from other sections on the chip by a reverse bias between the deep well of the second type and the substrate. Each well is controlled and its working conditions are modified depending on some parameters. The remainder of the chip is controlled as well, depending on other parameters. This requires that each well has a local controller communicating with a global controller. The main control parameters may e.g. be supply voltage, threshold voltage and clock frequency.

The present invention provides an integrated circuit comprising a plurality of computation islands. Each computation island may comprise at least one processing core or module. Each computation island is operating at one or more utility values, and at least one utility value of a first computation island is different from a corresponding utility value of a second computation island. The integrated circuit is provided with monitoring means for monitoring at least one working parameter related to a working condition of the integrated circuit, and at least two computation islands are provided with a local control device for independently tuning at least one utility value for at least one computation island, based on the monitored at least one working parameter. According to the present invention, the local control devices are provided with communication means to communicate with a global controller so as to obtain a pre-set level of performance of the integrated circuit. It is an advantage of the present invention that the way of controlling described leads to an overall optimal performance of the IC, which is obtained by locally controlling a plurality of islands. So the overall performance of the IC is optimal, while the performance of each of the islands is as optimal as possible, in view of the overall performance.

The one or more utility values may comprise one or more of supply power Vdd, transistor threshold voltage Vt or clock frequency ck. The transistor threshold voltage Vt may be determined by a bulk voltage of some transistors in a computational island, e.g. the transistors of the processing core or module. The at least one working parameter related to a global working condition of the integrated circuit may comprise at least one of circuit activity, circuit delay, power supply noise, logic noise margin values, threshold voltage value or clock frequency value. The pre-set level of performance may relate to any or all of power consumption or speed of the integrated circuit.

Each computation island may be placed in an isolated third well of a triple-well CMOS technology.

An integrated circuit according to the present invention may furthermore comprise at least one interface island for interfacing among computation islands, as the computation islands operate at different utility values, so direct interfacing between two computation islands might lead to problems with regard to signal integrity. An interface island may comprises at least a voltage level shifting device to translate voltage levels from one computation island to another computation island. An interface island may furthermore comprise FIFOs for inter-island communications.

At least two interface islands may be placed in a common third well, or substrate, of a triple-well CMOS technology. Preferably all interface islands are placed in one and the same common third well of a triple-well CMOS technology.

A computation island may furthermore comprise an actuator for tuning a utility value in a monitored utility value-regulating closed-loop system. A computation island may furthermore comprise a local monitoring means for monitoring local working parameters of the computation island.

An integrated circuit according to the present invention may furthermore comprise reference means for applying a power supply voltage reference value Vdd and/or a bulk voltage reference value $V_B$ to the at least two computation islands. The reference means may comprise a DC-DC converter.

The present invention also provides a method for real-time tuning of at least one utility value of an integrated circuit comprising a plurality of computation islands. Each computation island may comprise at least one processing core or module. Each computation island operates at one or more utility values, at least one utility value of a first computation island being different from a corresponding utility value of a second computation island. At least two computation islands are provided with a local control device for independently tuning at least one utility value for at least one computation island. The method comprises monitoring at least one working parameter related to a working condition of the integrated circuit, based on the monitored at least one working parameter, independently tuning at least one utility value for at least one computation island by means of its local controller, and controlling the local controllers of the computation islands by means of a global controller so as to obtain a pre-set level of performance of the integrated circuit.

The one or more utility values may comprise one or more of supply power Vdd, transistor threshold voltage Vt or clock frequency ck. The at least one working parameter may comprise at least one of circuit activity, circuit delay, power supply noise, logic noise margin values, threshold voltage value, clock frequency value. The preset level of performance may relate to any or all of power consumption or speed of the integrated circuit.

The tuning of the utility value may be performed by changing the bulk voltage $V_B$ of some transistors in a computational island, e.g. in the processing core or module.

The integrated circuit may be designed based on utility values different from their nominal values; what is also called a derated design.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 7:
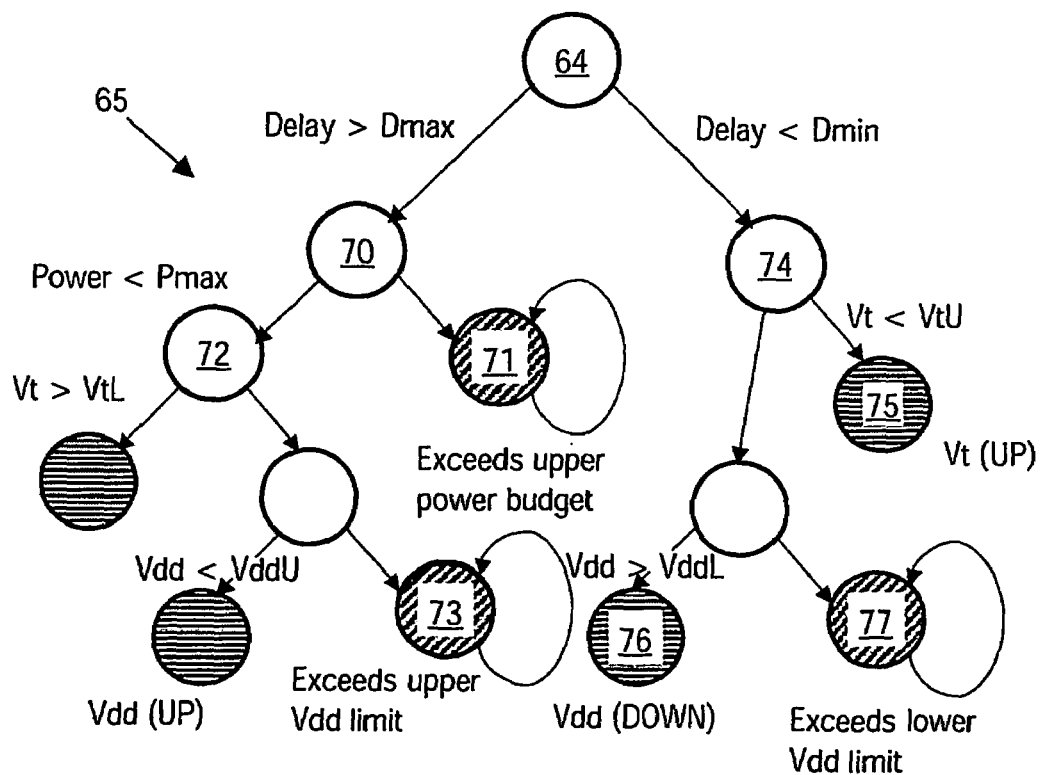
Figure 8:
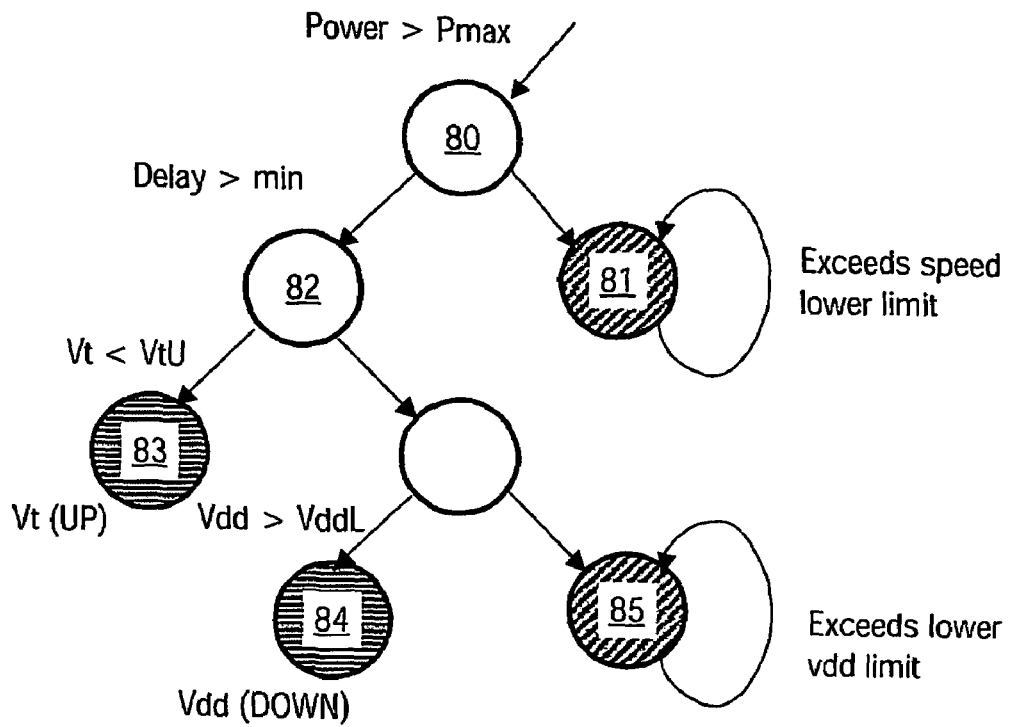
Figure 9:
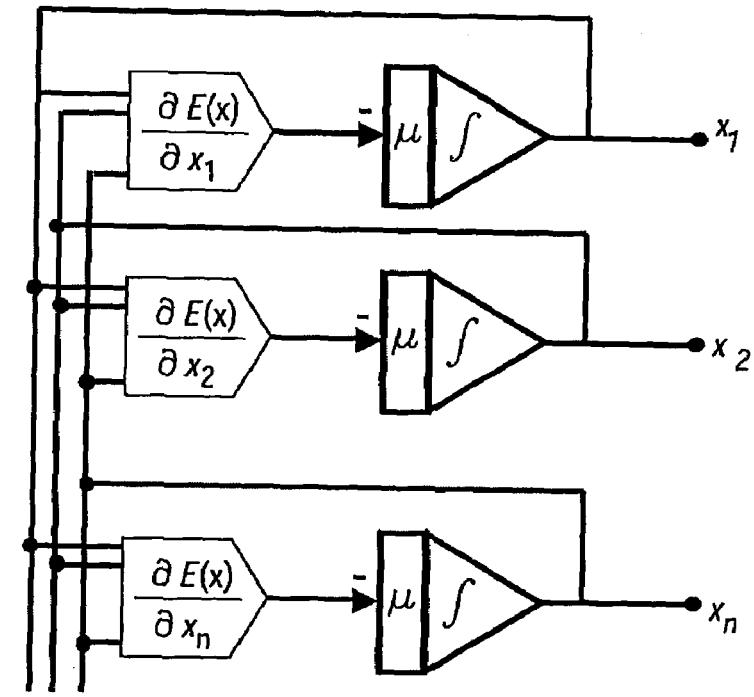
Figure 10:
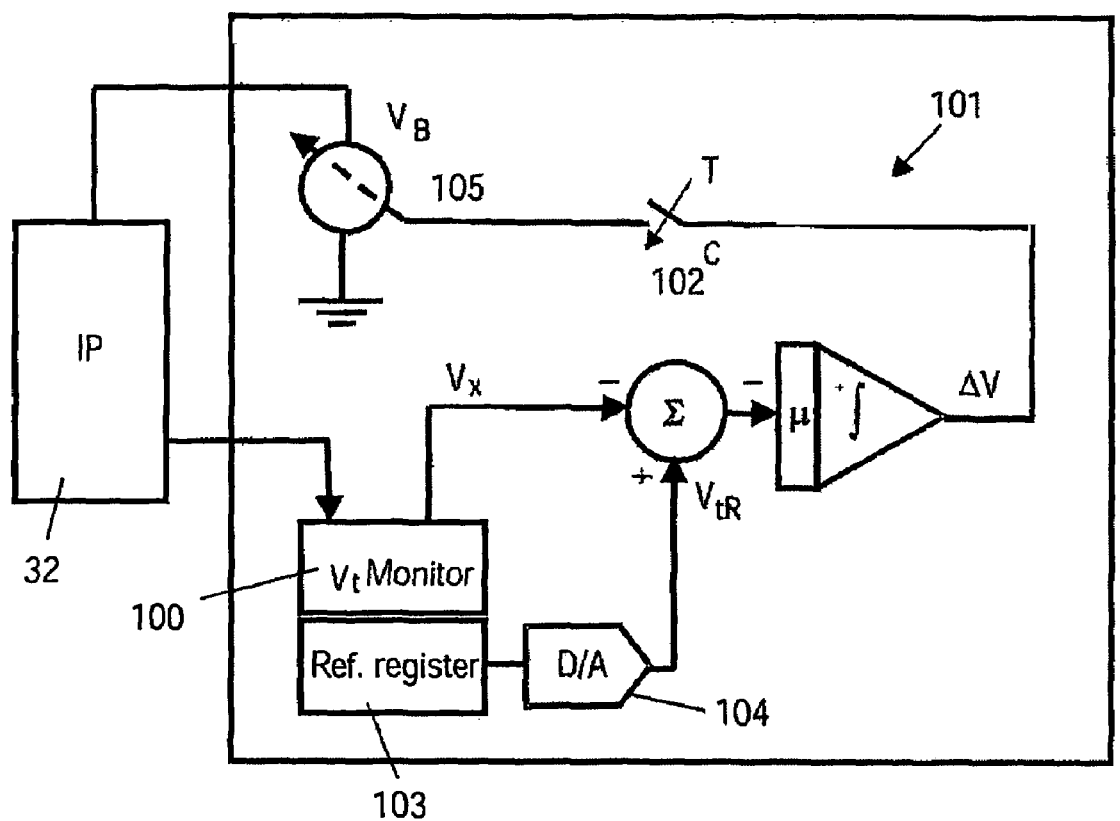

FIG. 7 illustrates a state diagram of delay check in a local controller according to an embodiment of the present invention FIG. 8 illustrates a state diagram of power check in a local controller according to an embodiment of the present invention FIG. 9 is a general circuit diagram for steepest descent FIG. 10 illustrates transistor threshold voltage adaptation according to an embodiment of the present invention.

In the different figures, the same reference figures refer to the same or analogous elements.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

According to the present invention, an integrated circuit (IC), e.g. a core (or Intellectual Property (IP) module) or a system-on-chip (SoC) is adapted so that a certain level of performance is guaranteed. In the following the word "chip" will be used to describe any of: IP module, system-on-chip, integrated circuit. . . . "A certain level of performance" means operating to with a certain operational constraint or to achieve a certain performance, e.g. in terms of any or both of speed and power consumption. This may be done by modifying the chip's working conditions by varying any of its utility values, such as e.g. supply voltage or current, transistor threshold voltage, or frequency. According to the present invention, such adaptive behavior is not on a global basis, but it is achieved with locality. Preferably, the chip is partitioned into different islands, e.g. logic in an IP, and IPs in an SoC. Preferably, each island is contained in an isolated third (e.g. deep-N) well of a triple-well CMOS technology. All the logic required for the chip timing closure, such as e.g. registers for an IP or communication infrastructure for an SoC, goes outside these wells.

Each well is controlled by a local controller, and its working conditions are modifiable depending upon the activity of the logic in the well itself, for example, according to the noise margin related to the signals traveling in the well. The modification is carried out with respect to the global level of performance, e.g. with regard to power consumption and/or speed of the chip, in mind.

Preferably, everything outside the well is controlled depending upon an external reference giving an index for global chip activity and process corner and working conditions.

Therefore, according to an aspect of the present invention, each well has a local controller communicating with a further controller such as global controller. The further controller also features distributed monitoring for the logic outside the well so as to consider the average level of performance values instead of local instantaneous values. Three main control parameters can be identified: supply voltage, transistor threshold voltage and clock frequency.

A method according to the present invention is a tuning scheme aimed at optimizing the performance of a chip, e.g. of at least one IP, online and in real-time. When applied, it finds the chip's, e.g. the IC's or IP's, optimum power supply (Vdd), transistor threshold voltage (Vt) and clock frequency (ck), henceforth called utility values or optimization variables, for a given desired performance in terms of speed and/or power consumption. The method according to the present invention senses the chip's, e.g. IP's or IC's, working parameters such as process spread, the electrical activity, a delay of a circuit and/or a power supply noise of a circuit, and adjusts accordingly the optimization variables provided that the IC's or IP's signal integrity is not compromised. The latter may be checked through a noise-margin monitor. The method searches an optimum power-delay product given the constraints imposed by the process spread. By tuning the power supply Vdd and the transistor threshold voltage Vt, there is also the possibility of minimizing the IC's or IP's leakage current in a standby mode. The utility values can be changed over a continuous range of values between a minimum value and a maximum value for each utility value.

Figure 1:
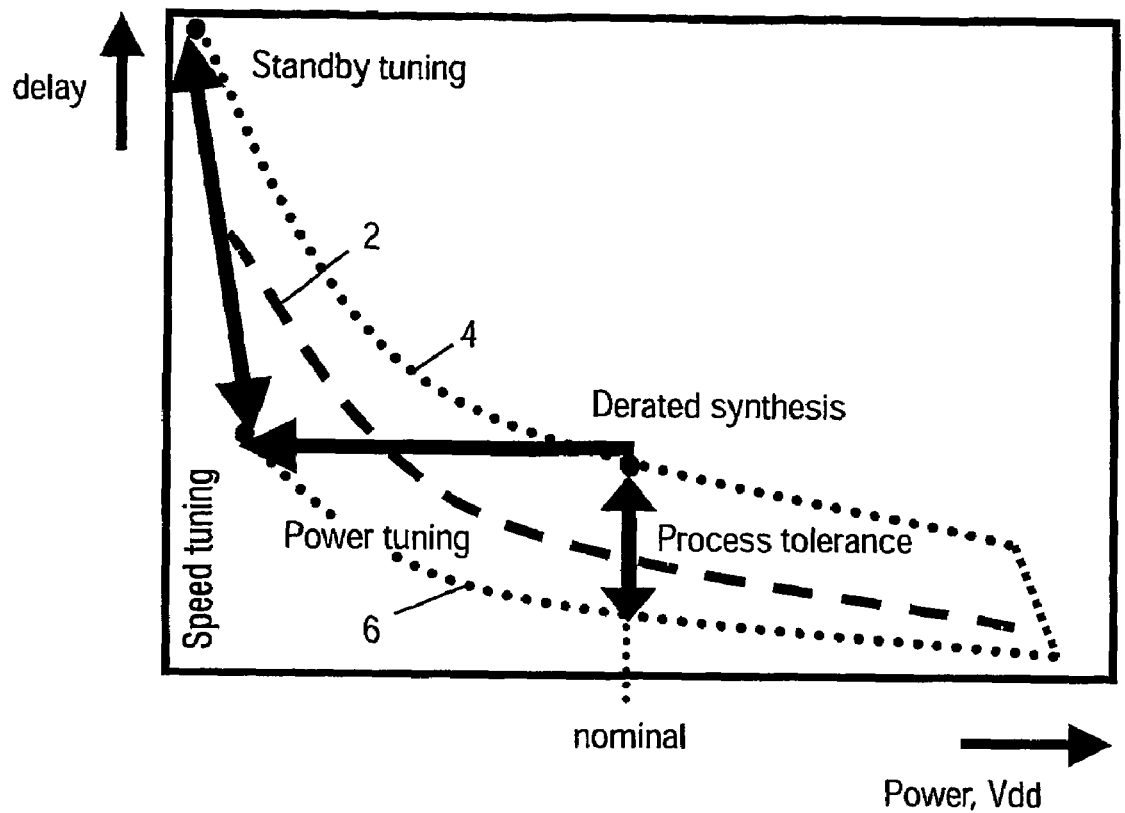
FIG. 1 illustrates a span of design possibilities of a method according to an embodiment of the present invention.

In FIG. 1 the power-delay curve 2 of an IC or IP is depicted when all transistors have a nominal transistor threshold voltage Vt. FIG. 1 also displays the opportunities for design under the method of the present invention, namely power, process, speed and leakage tuning. The upper curve 4 in FIG. 1 corresponds to a power-delay curve when all transistors have the highest possible Vt The lower curve 6 is a power-delay curve for a condition corresponding to the lowest allowable Vt for all transistors.

The method of the present invention can also be used for derated designs. Because of variability of a fabrication process, every chip in a wafer is different from the others. Typically, a wafer is divided in various regions yielding "slow", "nominal", and "fast" transistors. Conventional design methodologies make use of "nominal" conditions to carry out the design. However, because under the present invention it is possible to control the chip's utility values, it is thus possible to design the chip, under, say, the "slow" condition using power supply values Vdd and transistor threshold values Vt other than the nominal ones and still meet the required performance. This is referred to as "derated designs". The advantage of designing under the slow condition is that the leakage current is much less because the transistor threshold voltage is typically high. Under this concept it is possible to synthesize an IC or an IP using a Vdd-Vt-clock frequency triplet other than the nominal points bringing new opportunities for power-delay-area trade-offs.

From a system standpoint, the present invention provides an SoC (System On Chip) composed of a plurality of islands. An island is composed of one or more IPs or modules that have common electrical and activity characteristics. This partitioning into islands can be obtained at the hardware/software co-design partitioning stage. A distinction between different types of islands is made: there are interface islands and computation islands. Computation islands are electrically independent, e.g. each island has a distinct power supply value Vdd, transistor threshold voltage Vt, and/or clock frequency ck. Two IP's belonging to the same island have the same Vdd-Vt-ck triplet Interface islands are aware of the distinct electrical characteristics of the various computation islands.

Figure 2:
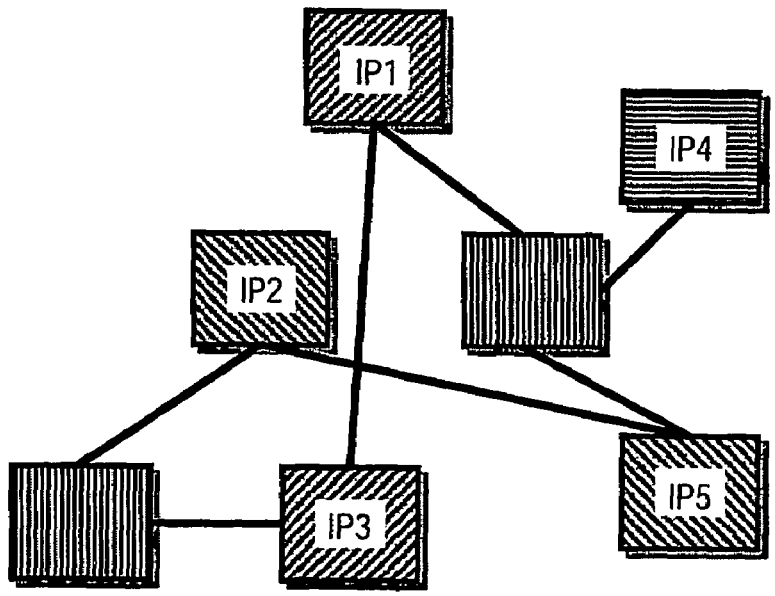
FIG. 2 illustrates the concept of clustering of elements into computation islands and interface islands.

FIG. 2 shows an example of the island concept in which five IPs, IP1, IP2, IP3, IP4 and IP5, are clustered together into three distinct computation islands illustrated by different ways of hatching. IP1 and IP3 belong to a first computation island, IP2 and IP5 belong to a second computation island, and IP4 belongs to a third computation island. Vertically hatched blocks are used to represent the interface islands. Since each computation island can have unique electrical characteristics, they communicate to each other through the interface islands (hatched vertically). These interface islands take care of interfacing the distinctive electrical characteristics of the computation islands as to avoid data synchronization errors and signal integrity violations.

In a device according to the present invention, an integrated circuit comprises a plurality of computation islands. Each computation island comprises, next to one or more IPs, means for monitoring at least one working parameter related to a working condition of the integrated circuit These means for monitoring at least one working parameter related to a working condition of the integrated circuit may include process, activity, and/or noise monitors. Each computation island also comprises actuators to adapt the utility values or optimization variables. Each computation island furthermore comprises a local controller. It is to be noted that the present invention is not intended for power management. Instead, it only adapts an IP to a desired performance decided upon by some other unit like a power management unit.

Figure 3:
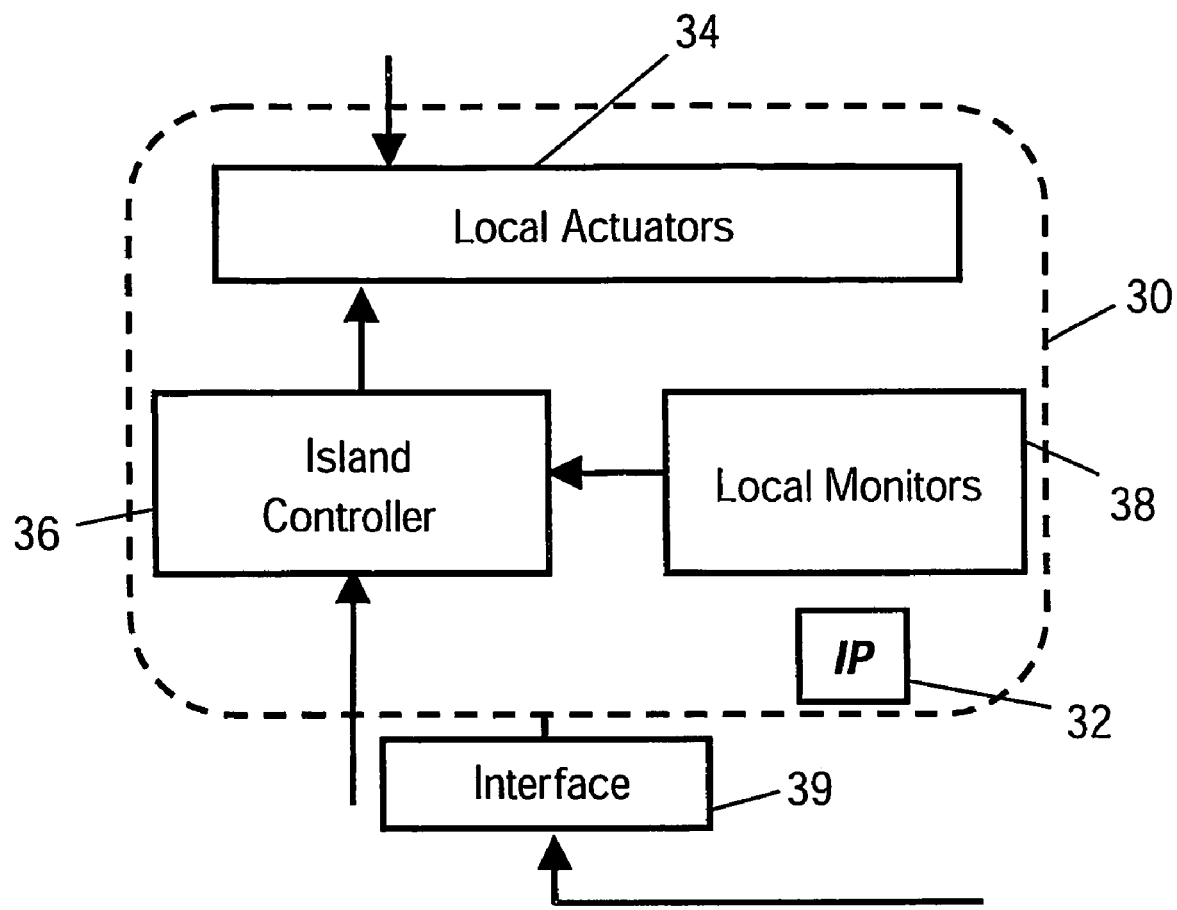
FIG. 3 is a block-schematic representation of an embodiment of a computation island according to the present invention.

FIG. 3 illustrates a computation island 30 comprising a single IP 32. Local actuators 34 adjust power supply voltage Vdd, transistor threshold voltage Vt and the clock frequency ck for this island 30 following orders from a (local) island controller 36. In turn, the island controller 36 decides upon the output of local monitors 38 the range to which the local actuators 34 can be controlled. The interface islands 39 remember the electrical characteristics of the IP 32 in this computation island 30.

Figure 4:
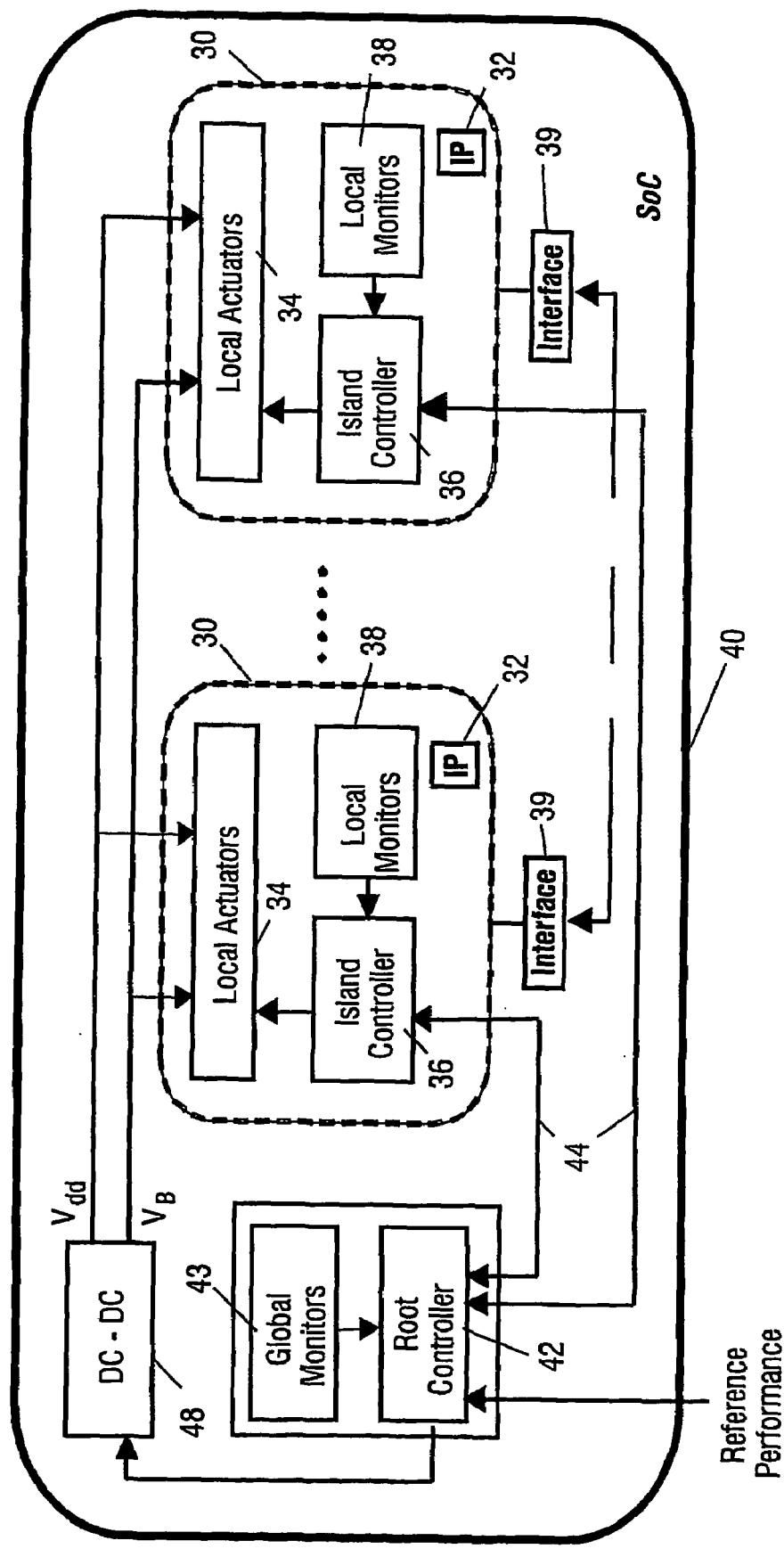
FIG. 4 illustrates an embodiment of a SoC implementing devices according to an embodiment of the present invention.

FIG. 4 shows an embodiment of an SoC 40 with a plurality of computation islands 30 and interface islands 39 according to an embodiment of the present invention. Each computation island 30 comprises at least one IP 32. Each of the computation islands 30 is as explained with respect to FIG. 3. A root controller or global controller 42 is interfaced to each of the local island controllers 36 by interfacing means such as a bus 44 for example. For simplicity, each island 30 comprises only one IP 32 in FIG. 4, but this example is not intended to limit the invention thereto. The root controller 42 regulates the performance of the entire SoC 40 and as such of each individual island 30. The root controller 42 decides upon the output of global monitors 43 the range to which the island controllers 36 can set the local actuators 34. The interface islands 39 between islands 30 may be implemented in any suitable manner, for example through FIFOS and using a technique called GALS (Globally asynchronous, locally synchronous). In this way, every island 30 is kept completely autonomous from the others. A DC/DC converter 48, although not necessary, may be provided for broadcasting a general power supply value Vdd and bulk voltage Vb reference. The threshold voltage Vt of the transistors is changed by properly biasing their bulk terminal. This technique is commonly referred to as "back-gate biasing". A transistor's bulk terminal is connected to the well where the transistor resides. For instance PMOS transistors reside in an N-Well (assuming again a triple-well CMOS technology). By biasing the well, e.g. the bulk terminal, the threshold voltage characteristics of all transistors in that well are automatically changed. A reference performance is applied to the root controller so that it can optimize the overall IC performance. The root controller keeps track of the performance of each island and functions according to a prescribed power management algorithm.

Figure 5:
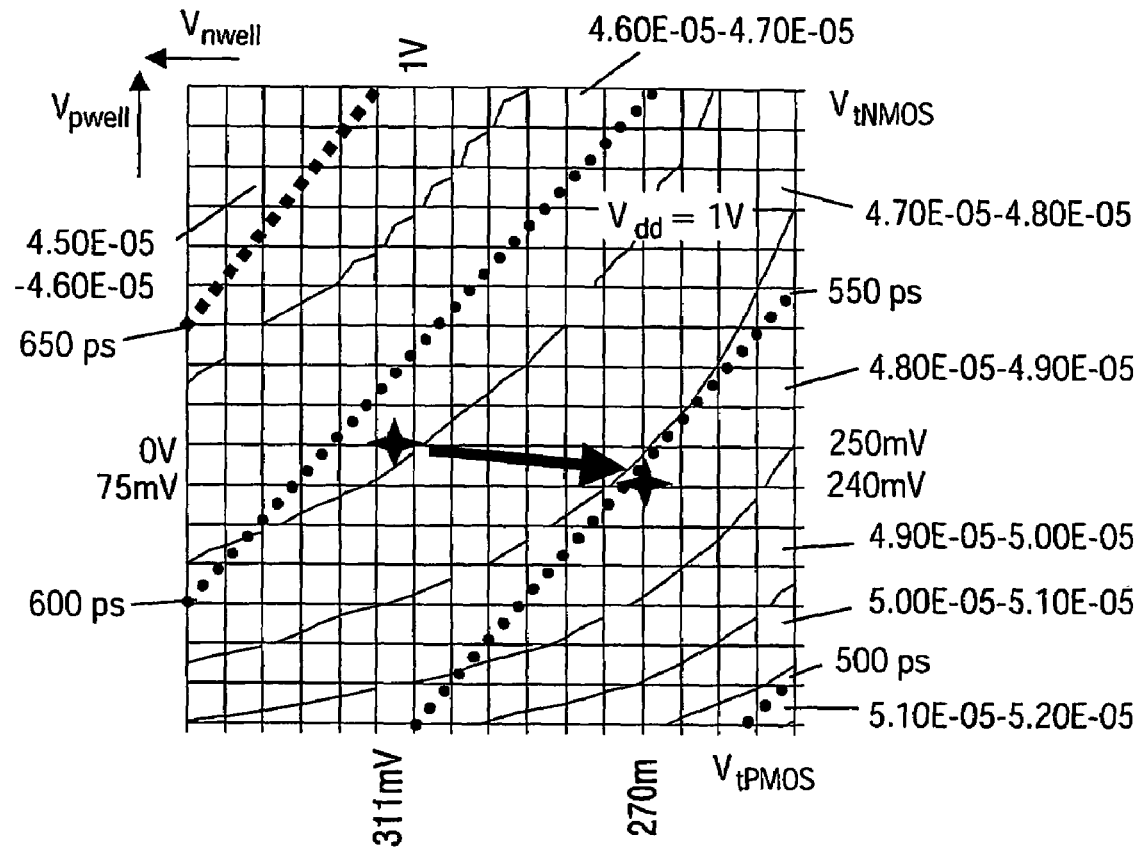
FIG. 5 illustrates power-delay iso-gradient contour plots over iso-power domains for a delay line circuit of eleven inverters in a 0.09 μm CMOS technology.

An example of applying a method according to principles of the present invention is illustrated in FIG. 5. It shows iso-gradient contour curves of delay (dotted lines) over iso-power domains for a delay line circuit comprising eleven inverters in a 0.09 μm CMOS technology. NMOS and PMOS threshold voltages for a typical and a slow process corner are also shown. This example demonstrates that with a method according to the present invention it is possible to tune a circuit such that, despite the fact that it was processed in a slow corner, its performance is comparable to one processed in a typical corner. Typically, 0 V would be applied to the P-well and 1 V would be applied to the N-well. When this is done, however, as shown in point 50 on FIG. 5, the system has a delay between 550 ps and 600 ps, which is slow. In order to obtain performance in the typical corner, the wells of the circuit are adapted to compensate for the process spread. This is achieved by applying 635 mV instead of 1 V to the N-well to lower the transistor threshold Vtp of PMOS transistors from 311 mV to 270 mV, and by applying 75 mV instead of 0 V to the P-well to lower the transistor threshold Vtn of NMOS transistors from 250 mV to 240 mV, as shown in point 52 on FIG. 5.

An example of a local island controller implementation is given hereinafter. This is one example only, and it is not intended to limit the invention to this implementation. In the forthcoming illustrations, all reference values are assumed to have been broadcasted by the root controller.

Figure 6:
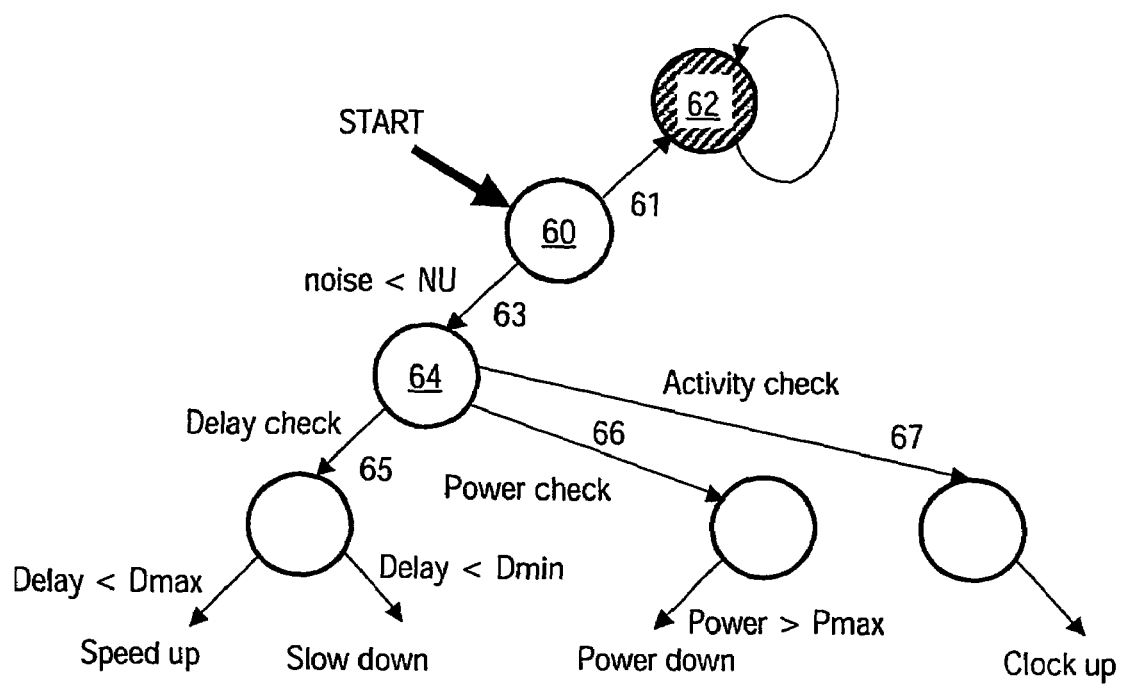
FIG. 6 illustrates a state diagram of a local controller according to an embodiment of the present invention.

FIG. 6 depicts a state diagram of a local island controller. The actual implementation can be done using any synthesis method. The logic behind the diagram given is as follows. Before adapting any of the utility values, a check 60 against the current noise margin is done to safeguard signal integrity. If the result 61 is that the current noise margin is larger than an upper noise limit NU, there is a potential risk, and the system locks in an "alert" state 62. If not, the result 63 of the check 60 is that the current noise margin is smaller than an upper noise limit NU, and the system comes in a "noise checked state" 64.

A delay check 65, a power check 66 and an activity check 67 are performed. If the delay is larger than the maximum delay Dmax, the system has to be speed up, an in the delay is smaller than the minimum delay, the system has to be slowed down. This is explained in more detail hereinafter with respect to a finite state machine illustrated in FIG. 7. On the other hand, if the power consumption is larger than the maximum power Pmax, the power consumption has to be brought down. This is illustrated in FIG. 8.

The delay finite state machine shown in FIG. 7 has a bifurcation between speeding up or slowing down the system. The local island controller expects from the root controller the maximum delay (Dmax) and minimum delay (Dmin) specs, as well as the maximum power (Pmax) and minimum power (Pmin) specs.

If the IP of the island does not meet the delay specs because the delay of the IP or plurality of IPs of the island considered is larger than the maximum delay Dmax of the system, a state indicated with 70 in FIG. 7 is reached. The local island controller proceeds to adjust the IP's delay provided that the power budget is not exceeded. Therefore, the IP's power budget is compared with the maximum power Pmax and with the minimum power Pmin. If the IP's power exceeds the maximum power Pmax, the system locks in an alert state 71 because the system exceeds the upper power budget. If not, i.e. the IP's power budget is smaller than the minimum power Pmin, then the finite state machine reaches state 72.

The local island controller adjusts first the threshold voltage Vt and subsequently the power supply. As long as Vt is larger than the lower limit of the threshold voltage, Vt can be adjusted and brought down. When Vt becomes equal to the lower limit VtL, then as long as the power supply value Vdd is lower than the upper limit VddU of the power supply value, Vdd can be raised. When Vdd becomes equal to VddU, the upper power supply limit VddU is exceeded, and the system locks in an alert state 73. VtU, VtL, VddU and VddL are the upper and lower limits of the threshold voltage and of the power supply.

On the other hand, if the IP of the island does not meet the delay specs because the delay of the IP or plurality of IPs of the island considered is smaller than the minimum delay Dmin of the system, a state indicated with 74 in FIG. 7 is reached.

The local island controller adjusts first the transistor threshold voltage Vt and subsequently the power supply. As long as Vt is smaller than the upper limit VtU of the threshold voltage, Vt can be adjusted by raising it (state 75). When Vt becomes equal to the upper limit VtU, then as long as the power supply value Vdd is higher than the lower limit VddL of the power supply value, Vdd can be decreased, as indicated with the state indicated with 76 in FIG. 7. When Vdd becomes equal to the lower power supply limit VddL, this lower power supply limit VddL is exceeded, and the system locks in an alert state 77.

The power check 66 shown in FIG. 8 is done only in cases when the power consumption exceeds its upper limit Pmax. Power adjustments are done provided that the circuit's delay is not compromised. The adaptation strategy is similar to the delay check as explained with regard to FIG. 7. Here again the transistor threshold voltage Vt is adapted first and then the power supply value Vdd.

If the power consumption exceeds the maximum limit of the power consumption Pmax, state 80 is reached. If the delay is smaller than the minimum delay Dmin the system exceeds the speed lower limit and locks in state 81. If not, i.e. if the delay of the system is larger than the minimum delay Dmin, then state 82 is reached. In first instance, as long as the transistor threshold voltage Vt is smaller than the upper limit VtU of the threshold voltage, Vt is adjusting by increasing it (state 83). As soon as Vt becomes equal to the upper limit VtU, then as long as the power supply value Vdd is higher than the lower limit VddL of the power supply value, Vdd can be decreased, as indicated with the state indicated with 84 in FIG. 8. When Vdd becomes equal to the lower power supply limit VddL, this lower power supply limit VddL is exceeded, and the system locks in an alert state 85.

The optimization variables or utility supply variables, i.e. Vdd, Vt and the clock frequency ck, can be optimized using general schemes like any gradient method such as, but not limited to, the steepest descent for example. This can formulated as $$\frac{dx_i}{dt} = -\mu(t)\frac{\partial E(x)}{\partial x_i}$$

where the cost function E(x) is optimized subject to $x_i$. FIG. 9 shows a general example of optimization using the steepest descent. Steepest descent is a mathematical method for unconstrained optimization. This method transforms the minimization problem to be solved into an associated system of first order differential equations. The steepest descent method finds an optimal x* that minimizes the function E(x). The minima of the energy function is determined by following the solution curve (trajectory) of the gradient system with $$x^* = \lim_{t \to \infty} x \quad (t)$$

FIG. 10 shows an example of threshold voltage adaptation using the steepest descent method as in FIG. 9. Part of an island 30 is shown comprising an IP 32, a Vt monitor 100, a negative feedback integrator system 101, a switch 102 to start/stop the adaptation, a register 103 and a D/A converter 104 and a controllable power supply 105 to adapt the IP's bulk to indirectly adjust the threshold voltage Vt. A reference transistor threshold value VtR is one of the values broadcast by the root controller. It is the value to which the transistor threshold value of that particular island should be set. This value may be provided as a digital word and stored in the register 103. It may be converted to an analog value via the D/A converter 104, compared in a comparator with the actual value of the transistor threshold voltage, and the actual value of he transistor threshold voltage Vt may adjusted via the negative feedback integrator system. In the above scheme it is expected that finite state machines shown in FIGS. 7-8 load the register 103 with the reference voltage. For simplicity these finite state machines have been omitted in FIG. 10. It can be observed that the tuning itself occurs autonomously in an analog fashion. In this set-up it is assumed that the threshold voltage Vt is adjusted through back biasing techniques. $V_B$ is a voltage controlled voltage source that is used for this purposes. Assuming that the IP has a threshold voltage Vt1 distinct from the reference threshold voltage VtR. The actual threshold voltage of the IP is obtained through the Vt monitor as Vx. The difference of VtR and Vx is averaged through the integrator with a time constance μ so that an error signal ΔV is produced. If this signal is zero, $V_B$ assumes its nominal value, meaning that $V_x$ is identical to VtR. If ΔV is different from zero, then $V_B$ is adjusted accordingly so that the Vt control system changes the IP's threshold voltage towards the reference value VtR.

It is to be understood that although preferred embodiments, specific constructions and configurations have been discussed herein for methods and devices according to the present invention, various changes or modifications in form and detail may be made without departing from the scope and spirit of this invention.

The invention claimed is:

1. An integrated circuit, comprising:
    a plurality of computation islands operating at one or more utility values, at least one utility value of a first computation island of the plurality of computation islands being different from a corresponding at least one utility value of a second computation island of the plurality of computation islands;
    a global monitor configured to monitor at least one working parameter related to a working condition of the integrated circuit; and
    at least one interface island for interfacing at least two of the plurality of computation islands,
    wherein each of the first and second computation islands comprises a local controller for independently tuning the corresponding at least one utility value based on the monitored at least one working parameter, the local controller communicating with a global controller to obtain a pre-set level of performance of the integrated circuit.

2. The integrated circuit according to claim 1, wherein the one or more utility values comprise one or more of supply power (Vdd), transistor threshold voltage (Vt) or clock frequency (ck).

3. The integrated circuit according to claim 2, wherein the transistor threshold voltage is determined by a bulk voltage of at least one transistor in a computational island.

4. The integrated circuit according to claim 1, wherein the at least one working parameter comprises at least one of circuit activity, circuit delay, power supply noise, logic noise margin values, threshold voltage value, or clock frequency value.

5. The integrated circuit according to claim 1, wherein the pre-set level of performance relates to at least one of power consumption or speed of the integrated circuit.

6. The integrated circuit according to claim 1, wherein each computation island is located in an isolated third well of a triple-well CMOS technology.

7. The integrated circuit according to claim 1, wherein at least two interface islands are located in a common third well, or a substrate, of a triple-well CMOS technology.

8. The integrated circuit according to claim 1, wherein each of the first and second computation islands further comprises an actuator for tuning the at least one utility value in a monitored utility value-regulating closed-loop system.

9. The integrated circuit according to claim 1, wherein each of the first and second computation islands further comprises a local monitor for monitoring local working parameters.

10. A method for real-time tuning of at least one utility value of an integrated circuit, comprising a plurality of computation islands operating at one or more utility values, each of the computation islands comprising a local controller for independently tuning the at least one utility value for the computation island, the method comprising:
    monitoring at least one working parameter related to a working condition of the integrated circuit;
    independently tuning the at least one utility value for at least one computation island of the plurality of computation islands using the corresponding local controller, based on the monitored at least one working parameter; and
    controlling each local controller of each computation island using a global controller to obtain a pre-set level of performance of the integrated circuit,
    wherein the at least one working parameter comprises at least one of circuit activity, circuit delay, power supply noise, or logic noise margin values.

11. The method according to claim 10, wherein the at least one utility value comprises one or more of supply power (Vdd), transistor threshold voltage (Vt) or clock frequency (ck).

12. The method according to claim 10, wherein the at least one working parameter further comprises at least one of threshold voltage value or clock frequency value.

13. The method according to claim 10, wherein the pre-set level of performance relates to at least one of power consumption or speed of the integrated circuit.

14. The method according to claim 10, wherein the integrated circuit is designed based on utility values different from nominal values.

15. An integrated circuit, comprising:
- a first computation island having a first value of a utility value, the first computation island comprising a first local controller and a first actuator;
- a second computation island having a second value of the utility value, the second computation island comprising a second local controller and a second actuator, the second computation island being isolated from the first computation island;
- an interface island for interfacing the first and second computation islands;
- a global monitor configured to monitor a working parameter related to a working condition of the integrated circuit; and
- a global controller configured to determine a range of the utility value for each of the first computation island and the second computation island based on the monitored working parameter,
- wherein each of the first and second local controllers obtains a pre-set level of performance of the integrated circuit from the global controller and independently tunes the utility value within the range of the utility value based on the monitored at least one working parameter.

* * * * *